United States Patent
Bechtold et al.

(10) Patent No.: US 8,936,131 B2
(45) Date of Patent: Jan. 20, 2015

(54) FORWARD STRUCTURE FOR A MOTOR VEHICLE

(75) Inventors: Ralf-Dieter Bechtold, Weinolsheim (DE); Stephan Blässer, Wahlheim (DE); Sascha Hoffeller, Dalheim (DE)

(73) Assignee: GM Global Technology Operations LLC, Detroit, MI (US)

(*) Notice: Subject to any disclaimer, the term of this patent is extended or adjusted under 35 U.S.C. 154(b) by 833 days.

(21) Appl. No.: 11/996,327

(22) PCT Filed: Jul. 20, 2006

(86) PCT No.: PCT/EP2006/007157
§ 371 (c)(1),
(2), (4) Date: Jan. 21, 2008

(87) PCT Pub. No.: WO2007/012431
PCT Pub. Date: Feb. 1, 2007

(65) Prior Publication Data
US 2008/0231081 A1    Sep. 25, 2008

(30) Foreign Application Priority Data
Jul. 23, 2005   (DE) .......................... 10 2005 034 445

(51) Int. Cl.
  B62D 21/00    (2006.01)
  B62D 21/15    (2006.01)
(52) U.S. Cl.
  CPC .................................. *B62D 21/155* (2013.01)
  USPC .......................................... 180/312; 180/311

(58) Field of Classification Search
  USPC ............ 180/68.4, 54.1, 311, 312; 280/106 R, 280/784, 785, 798; 296/205, 29, 203, 296/203.02, 189, 203.1, 187.09; 293/132, 293/133
  See application file for complete search history.

(56) References Cited

U.S. PATENT DOCUMENTS

| | | | | |
|---|---|---|---|---|
| 3,912,295 A | * | 10/1975 | Eggert, Jr. ..................... | 280/784 |
| 6,010,182 A | * | 1/2000 | Townsend ................ | 296/203.01 |
| 6,470,990 B1 | * | 10/2002 | Panoz ........................... | 180/311 |
| 6,533,348 B1 | * | 3/2003 | Jaekel et al. .................. | 296/205 |
| 6,665,935 B2 | * | 12/2003 | Panoz .......................... | 280/785 |

(Continued)

FOREIGN PATENT DOCUMENTS

| | | |
|---|---|---|
| CH | 1911993 A | 10/1937 |
| DE | 823698 C | 12/1951 |

(Continued)

OTHER PUBLICATIONS

International Searching Authority, International Search Report for PCT Application No. PCT/EP/2006/007157, dated Sep. 27, 2006.

(Continued)

*Primary Examiner* — Hau Phan
(74) *Attorney, Agent, or Firm* — Ingrassia Fisher & Lorenz, P.C.

(57) ABSTRACT

In the case of a front structure of a motor vehicle two cross members are connected to one another by means of a longitudinal beam. One of the attachments of the longitudinal beam is displaceable by an amount X in the direction of travel and has an adapter made from plastic. During driving operation a transfer of vibrations between the cross members is prevented by means of the attachment. In the event of a crash, the cross member oriented in the direction of travel is supported by the longitudinal beam.

6 Claims, 1 Drawing Sheet

(56) References Cited

U.S. PATENT DOCUMENTS

| | | | |
|---|---|---|---|
| 6,676,709 B1 * | 1/2004 | de la Asuncion | 280/784 |
| 6,851,505 B2 * | 2/2005 | Motozawa et al. | 180/274 |
| 7,070,217 B2 * | 7/2006 | Longo | 293/132 |
| 7,357,445 B2 * | 4/2008 | Gross et al. | 296/187.09 |
| 7,503,623 B2 * | 3/2009 | Favaretto | 296/203.01 |

FOREIGN PATENT DOCUMENTS

| | | |
|---|---|---|
| DE | 916152 C | 8/1954 |
| DE | 4138778 | 6/1992 |
| DE | 19810123 A1 | 9/1999 |
| DE | 19847389 A1 | 4/2000 |
| EP | 0888993 A1 | 1/1999 |
| EP | 0945328 | 9/1999 |
| EP | 1184260 | 3/2002 |
| EP | 1184261 | 3/2002 |
| EP | 1184263 A1 | 3/2002 |
| EP | 1256510 | 11/2002 |

OTHER PUBLICATIONS

Chinese Patent Office, Chinese Search Report for Chinese Application No. 200680022909.0, dated Mar. 14, 2011.

* cited by examiner

FORWARD STRUCTURE FOR A MOTOR VEHICLE

CROSS-REFERENCE TO RELATED APPLICATIONS

This application is a U.S. National-Stage entry under 35 U.S.C. §371 based on International Application No. PCT/EP2006/007157 filed Jul. 20, 2006, which was published under PCT Article 21(2) and which claims priority to German Application No. DE 10 2005 034 445.3, filed Jul. 23, 2005.

TECHNICAL FIELD

The invention relates to a front structure for a motor vehicle with a front cross member and a rear cross member, wherein the cross members are connected by means of a longitudinal beam oriented in the direction of travel.

BACKGROUND

Current motor vehicles have different load paths in their front region, by means of which forces are supported in the event of a crash. A lower load path is formed by means of a cross member configured as a sub-frame, which can also be configured as a sub-frame. The sub-frame supports the engine assembly of the motor vehicle and the wheel suspension with the steering stabiliser. A cross member configured as a radiator cross member is arranged in the front region of a body of the motor vehicle. To increase the stability of the front structure the sub-frame is generally connected to the radiator cross member by means of a hydroformed pipe. However, this results in a very costly design of the shape of the connection. Moreover, the connection is even damaged in the event of a very minor crash at a low speed and requires a highly costly repair.

The problem forming the basis of the invention is to further develop a front structure of the aforementioned type, so that its stability for rated loads, e.g. in the event of a crash, is very easy to adapt and so that it is particularly inexpensive to repair after a crash.

SUMMARY

This problem is solved according to the invention in that the longitudinal beam is detachably fastened to the cross members.

As a result of this design, a correspondingly rigid and wide longitudinal beam can be easily connected to the cross members, depending on the required rigidity of the front structure according to the invention. Therefore, a costly adaptation of the cross members to the required rigidity can be largely avoided. Moreover, the damaged longitudinal beam can be easily replaced after a crash. Since the longitudinal beam is damaged first, in particular in the event of a crash at a low speed, repairs on one or both cross members can frequently be avoided. Therefore, the front structure according to the invention is particularly inexpensive to repair in the event of a crash.

According to an advantageous further development of the invention, a transfer of vibrations between the cross members can be simply prevented if the longitudinal beam is displaceable in the direction of travel by a specified extent at least one of the attachments. The prevention of vibrations is particularly advantageous if one of the cross members supports part of the body of the motor vehicle and the other cross member supports the internal combustion engine or the axles of the motor vehicle. In addition, this type of attachment allows tolerances to be compensated between the cross members, so that displacement between the cross members is prevented. As a result of the invention, no forces are transferred by means of the displaceable attachment during driving operation. However, since the ability of the attachment to be displaced by the provided dimension is restricted, the cross members are reliably supported against one another in the event of a crash. For the displaceability, 1 to 3 cm, for example, can be provided as the specified extent.

According to another advantageous further development of the invention, a structurally particularly simple way of reliably directing forces from one cross member to the other cross member is provided if the attachment, which is displaceable in the direction of travel, is arranged on the rear cross member viewed in the direction of travel.

According to another advantageous further development of the invention, the attachment of the longitudinal beam to the cross member requires a particularly low structural expenditure if an adapter is arranged on the rear and/or the front cross member, and if the adapter has an external cross-section corresponding to the internal cross-section of the longitudinal beam.

The assembly of the front structure according to the invention is particularly simple in configuration if at least one of the adapters is screwed to one of the cross members.

According to another advantageous further development of the invention, a transfer of vibrations or structure-borne noise via the longitudinal beam can be easily prevented if at least one of the adapters is made from plastic.

The displaceable attachment of the longitudinal beam to one cross member has a high stability transversely to the direction of travel if the displaceable attachment of the longitudinal beam to the cross member has a sleeve screwed to the cross member, and if the adapter surrounds the sleeve. Because the longitudinal beam surrounds the adapter, forces directed transversely into the displaceable attachment are reliably supported by means of the adapter and the sleeve screwed to the cross member.

The front structure according to the invention can be produced particularly inexpensively if the longitudinal beam is produced from tubular steel.

The front structure according to the invention allows a so-called lower load path to be generated if the rear cross member, viewed in the direction of travel, is configured as a sub-frame provided to support axles of the motor vehicle and the front cross member is configured as a radiator cross member. The radiator cross member, which delimits a motor vehicle body in the direction of travel, is arranged in the lower region of the front structure approximately at the level of the axle cross member. In this case, the longitudinal beam connected to the cross members forms the lower load path, via which forces are supported in the event of the crash.

BRIEF DESCRIPTION OF THE DRAWINGS

The present invention will hereinafter be described in conjunction with the following drawing figures, wherein like numerals denote like elements, and FIG. 1 schematically shows a front structure of a motor vehicle according to the invention.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
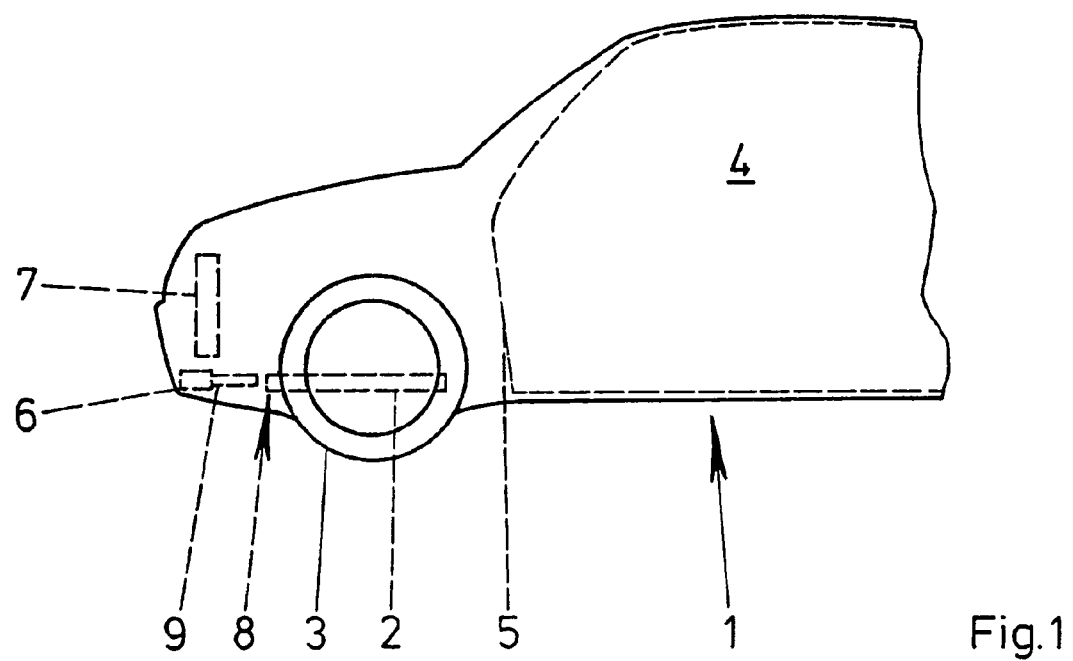

FIG. 1 schematically shows a front structure of a motor vehicle with a motor vehicle body 1 and with a sub-frame 2 mounted on the motor vehicle body 1. The sub-frame 2 supports axles of front wheels 3 of the motor vehicle and an internal combustion engine. To simplify the drawing, the axles and the internal combustion engine are not shown. The motor vehicle body 1 has a front wall 5 delimiting a passenger compartment 4 in the direction of travel. A cross member 6 configured as a radiator cross member is arranged in front of the sub-frame 2, viewed in the direction of travel. A radiator 7 is arranged above the cross member 6 configured as a radiator cross member. The sub-frame 2 also has a cross member 8 on its end oriented in the direction of travel. The cross members 8 are connected to one another by means of a longitudinal beam 9.

Figure 2:
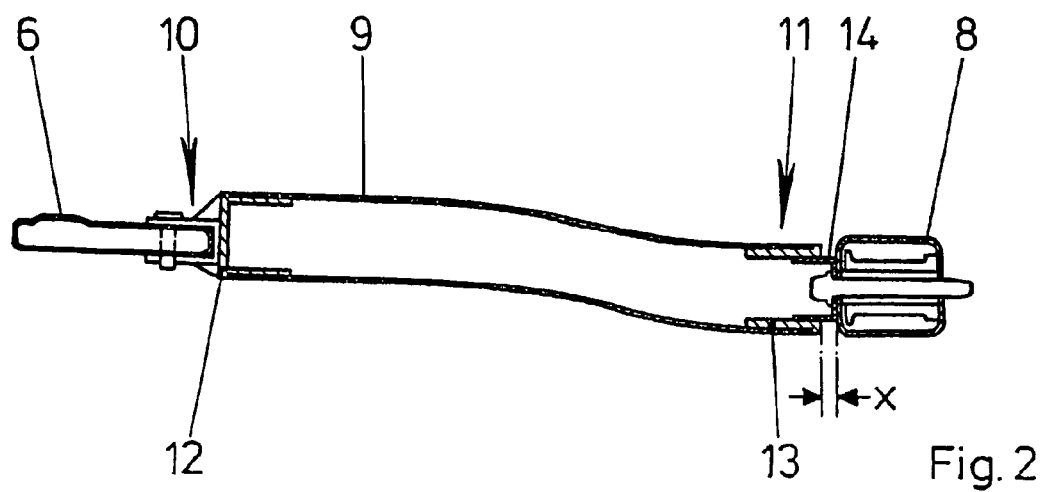
FIG. 2 is a highly enlarged representation of a longitudinal beam of the front structure according to the invention from FIG. 1 arranged between two cross members.

FIG. 2 is a highly enlarged view of the longitudinal beam 9 with attachments 10, 11 on the cross beams 6, 8 from FIG. 1. It can be seen here that the longitudinal beam 9 is connected at its two ends to adapters 12, 13 made from plastic. The adapters 12, 13 are part of the attachments 10, 11 of the longitudinal beam 9 to the cross members 6, 8. The front adapter 12 oriented in the direction of travel is screwed to the cross member 6 configured as a radiator cross member. The rear adapter 13 is pushed on a sleeve 14 screwed to the cross member 8 of the sub-frame 2. Both adapters 12, 13 have an external cross-section corresponding to the internal cross-section of the longitudinal beam 9. The adapter 13 pushed on the sleeve 14 has a spacing X from the cross member 8 of the sub-frame 2. As a result, the attachment of the longitudinal beam 9 to the rear cross member 8 is displaceable by the amount X. The longitudinal beam 9 is configured as a tubular piece.

To disassemble the longitudinal beam 9, the front attachment 10 of the longitudinal beam 9 to the front cross member 6 is released by releasing the screw joint. The longitudinal beam 9 can then be removed from the sleeve 14 with the adapter 13 of the rear displaceably configured attachment 11.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A front structure for a motor vehicle, the front structure comprising:
    a longitudinal beam having a rear end and a front end;
    a rear cross member disposed adjacent the rear end and oriented substantially transversely to the longitudinal beam; and
    a joining member attached to the rear cross member and to the longitudinal beam, the joining member being configured to permit sliding movement of the longitudinal beam with respect to the rear cross member in a direction of travel of the motor vehicle without substantially damaging the rear cross member; wherein the rear end includes a wall defining a recess, the joining member comprises a protrusion configured to fit within the recess and wherein engagement between the joining member and the wall defining the recess guides displacement between the longitudinal beam and the rear cross member.

2. The front structure of claim 1, wherein the rear end comprises a tube portion defined by the wall, and wherein the joining member comprises an adapter configured to engage the wall and a sleeve received within the adapter and attached to the rear cross member, the sleeve configured to slide with respect to the adapter.

3. A front structure for a motor vehicle, the front structure comprising:
    a longitudinal beam having a rear end and a front end;
    a rear cross member disposed adjacent the rear end and oriented substantially transversely to the longitudinal beam;
    a joining member attached to the rear cross member and to the longitudinal beam, the joining member being configured to permit sliding movement of the longitudinal beam with respect to the rear cross member in a direction of travel of the motor vehicle without substantially damaging the rear cross member; and
    a front cross member attached to the front end and oriented substantially transversely to the longitudinal beam; wherein the longitudinal beam is configured as a tube and defines an opening at the rear end and wherein the joining member is configured to fit within the opening and to engage an inner wall of the longitudinal beam to guide sliding movement of the longitudinal beam with respect to the rear cross member.

4. The front structure of claim 3 wherein the joining member is removeably attached to the rear cross member.

5. The front structure of claim 3 wherein the joining member comprises an adapter and a sleeve, the adapter being fixed to the rear end of the longitudinal beam and the sleeve being fixed to the rear cross member, the sleeve being configured to engage the adapter and to move with respect to the adapter in a direction of vehicle travel.

6. The front structure of claim 3, wherein the rear cross member comprises a sub-frame to support axles of the motor vehicle and wherein the front cross member comprises a radiator cross member.

\* \* \* \* \*